United States Patent
O'Neal et al.

(10) Patent No.: US 7,423,256 B2
(45) Date of Patent: Sep. 9, 2008

(54) INFORMATION HANDLING SYSTEM LIGHT SENSOR

(75) Inventors: Sean Patrick O'Neal, Austin, TX (US); Kyle David Spiess, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 11/551,879

(22) Filed: Oct. 23, 2006

(65) Prior Publication Data

US 2008/0093535 A1   Apr. 24, 2008

(51) Int. Cl.
*G06M 7/00* (2006.01)
*H01J 5/02* (2006.01)

(52) U.S. Cl. ...................... 250/221; 250/239

(58) Field of Classification Search ............ 250/221, 250/216, 222.1, 239; 355/69, 71; 361/685; 356/399, 400; 349/41–43; 345/206, 207, 345/698

See application file for complete search history.

(56) References Cited

U.S. PATENT DOCUMENTS

| | | | |
|---|---|---|---|
| 5,760,760 A | 6/1998 | Helms | |
| 5,818,553 A | 10/1998 | Koenck et al. | |
| 7,110,062 B1 | 9/2006 | Whitted et al. | |
| 2002/0101574 A1* | 8/2002 | Tsuji | 355/69 |
| 2007/0268661 A1* | 11/2007 | Wobig et al. | 361/685 |

* cited by examiner

*Primary Examiner*—Georgia Y. Epps
*Assistant Examiner*—Don Williams
(74) *Attorney, Agent, or Firm*—Haynes and Boone, LLP

(57) ABSTRACT

A light sensor apparatus includes a support surface. A wall is located adjacent to and spaced apart from the support surface. A light aperture is defined by the wall. A light sensor is coupled to the support surface by an extendable member, whereby the extendable member is operable to adjust the distance between the support surface and the light aperture such that the light sensor is located adjacent the light aperture. The light sensor apparatus may be used to align an ambient light sensor on an information handling system with a light aperture defined by a cover wall on the information handling system chassis such that the light aperture can remain relatively small while still allowing the required amount of light to reach the light sensor in order for the light sensor to function.

20 Claims, 4 Drawing Sheets

INFORMATION HANDLING SYSTEM LIGHT SENSOR

BACKGROUND

The present disclosure relates generally to information handling systems, and more particularly to an information handling system light sensor.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Some IHSs include light sensors such as, for example, ambient light sensors, to provide battery life savings by reducing the display brightness automatically in darker environments. These light sensors can also increase the brightness of the display in brighter environments to increase usability. The coupling of these light sensors to the IHS and the IHS chassis can raise a number of issues.

Typically, the most cost effective method of coupling the light sensor to the IHS is to manufacture the light sensor directly on the backlight inverter board of the IHS. Conventionally, the sensor is mounted to the inverter board, the inverter board extends from the LCD panel, the LCD panel is coupled to the LCD bracket, the LCD bracket is coupled to the LCD cover, the LCD cover is coupled to the LCD bezel, and the LCD bezel is coupled to the light sensor lens. These couplings can result in a tolerance stack that require the light sensor lens, or light sensor aperture when there is no lens, to be relatively large. The required size of the lens or aperture may be such that the light sensor feature is not included in the IHS due to, for example, industrial design concerns. Conventional solutions to this problem include mounting the light sensor directly to the LCD bezel immediately adjacent the lens or aperture and cabling the light sensor to the inverter board. However, this results in problems associated with damaging the cabling during the installation and removal of the LCD bezel.

Accordingly, it would be desirable to provide an IHS light sensor absent the disadvantages found in the prior methods discussed above.

SUMMARY

According to one embodiment, a light sensor apparatus includes a support surface, a wall located adjacent to and spaced apart from the support surface, a light aperture defined by the wall, and a light sensor coupled to the support surface by an extendable member, whereby the extendable member is operable to adjust the distance between the support surface and the light aperture such that the light sensor is located adjacent the light aperture.

BRIEF DESCRIPTION OF THE DRAWINGS

FIG. 2b is a cross sectional view illustrating an embodiment of the display bezel of FIG. 2a.

FIG. 3b is a cross sectional view illustrating an embodiment of the IHS housing member of FIG. 3a.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
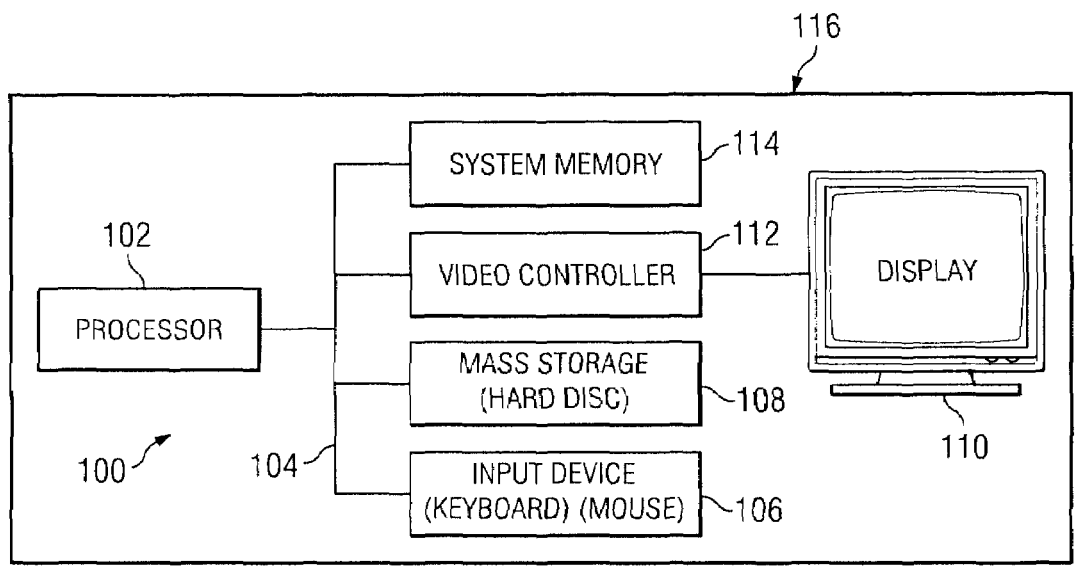
FIG. 1 is a schematic view illustrating an embodiment of an IHS.

In one embodiment, IHS 100, FIG. 1, includes a processor 102, which is connected to a bus 104. Bus 104 serves as a connection between processor 102 and other components of computer system 100. An input device 106 is coupled to processor 102 to provide input to processor 102. Examples of input devices include keyboards, touchscreens, and pointing devices such as mouses, trackballs and trackpads. Programs and data are stored on a mass storage device 108, which is coupled to processor 102. Mass storage devices include such devices as hard disks, optical disks, magneto-optical drives, floppy drives and the like. IHS 100 further includes a display 110, which is coupled to processor 102 by a video controller 112. A system memory 114 is coupled to processor 102 to provide the processor with fast storage to facilitate execution of computer programs by processor 102. In an embodiment, a chassis 116 houses some or all of the components of IHS 100. It should be understood that other buses and intermediate circuits can be deployed between the components described above and processor 102 to facilitate interconnection between the components and the processor 102.

Figure 2A:
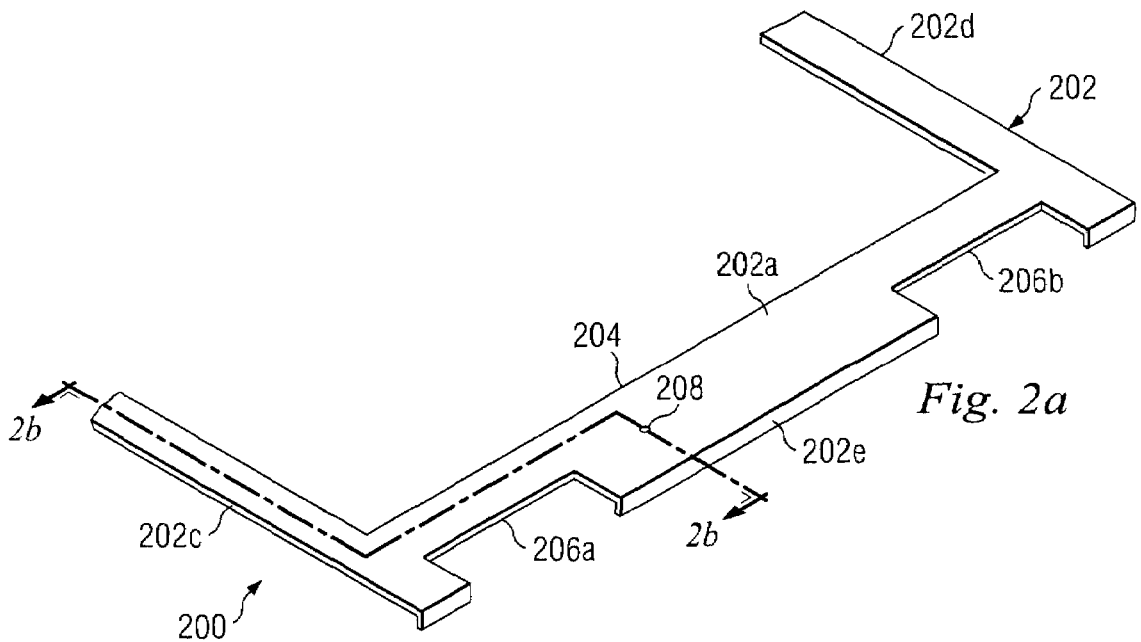
FIG. 2a is a perspective view illustrating an embodiment of a display bezel.
Figure 2B:
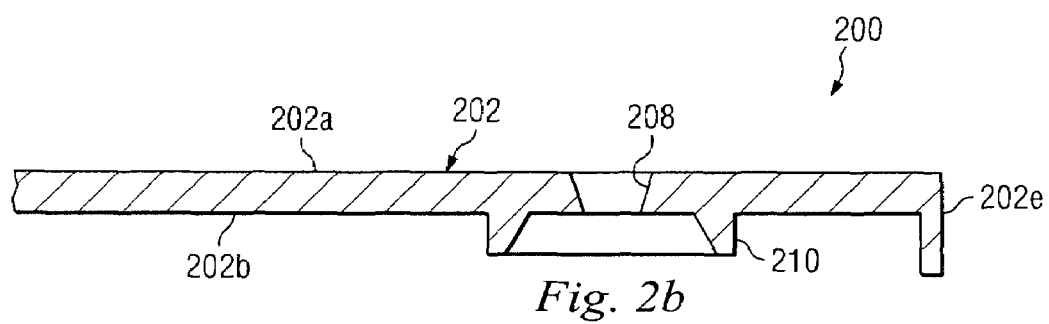

Referring now to FIGS. 2a and 2b, a display bezel 200 is illustrated. The display bezel 200 includes a wall 202 having a top surface 202a, a bottom surface 202b located opposite the top surface 202a, a pair of opposing side edges 202c and 202d extending between the top surface 202a and the bottom surface 202b, and a bottom edge 202e extending between the side edges 202b and 202c. A display aperture 204 is defined by and centrally located on the wall 202 and extends through the wall 202 from the top surface 202a to the bottom surface 202b. A pair of coupling channels 206a and 206b are defined by the wall 202 and located in a spaced apart orientation from each other and adjacent the bottom edge 202e of the wall 202. A light aperture 208 is defined by the wall 202, located between the display aperture 204 and the bottom edge 202e of the wall 202, and extends through the wall 202 from the top surface 202a to the bottom surface 202b. A light sensor alignment member 210 extends from the bottom surface 202b of the wall 202 and is located about the perimeter of the light aperture 208.

Figure 3A:
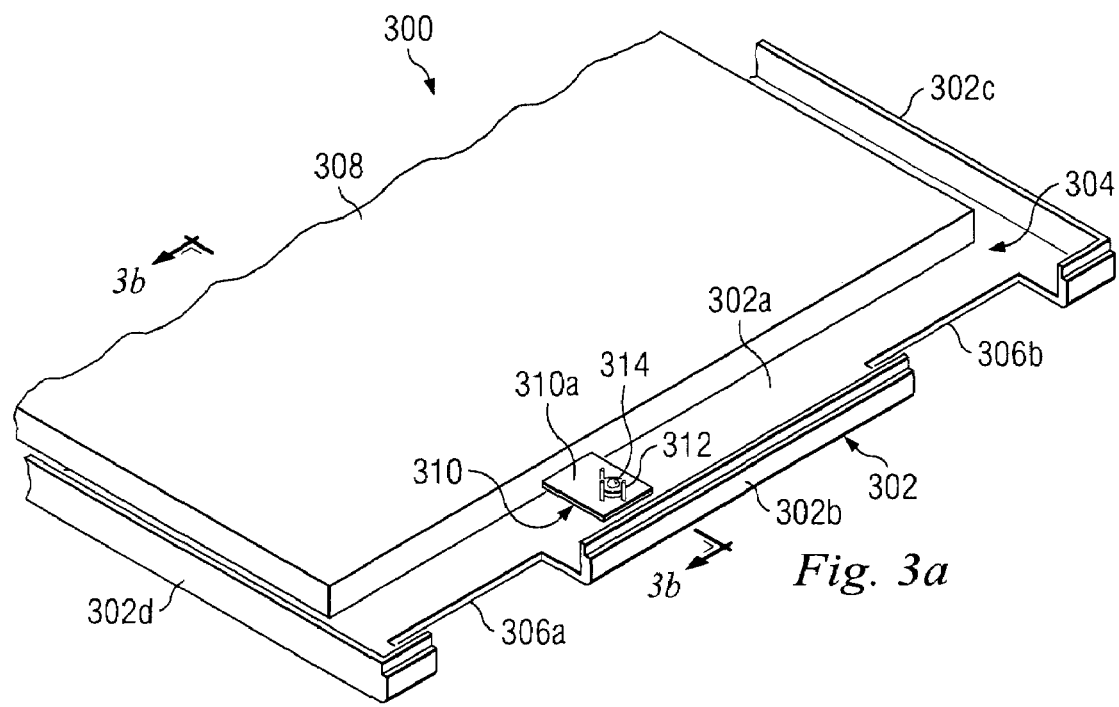
FIG. 3a is a perspective view illustrating an embodiment of an IHS housing member used with the display bezel of FIGS. 2a and 2b.
Figure 3B:
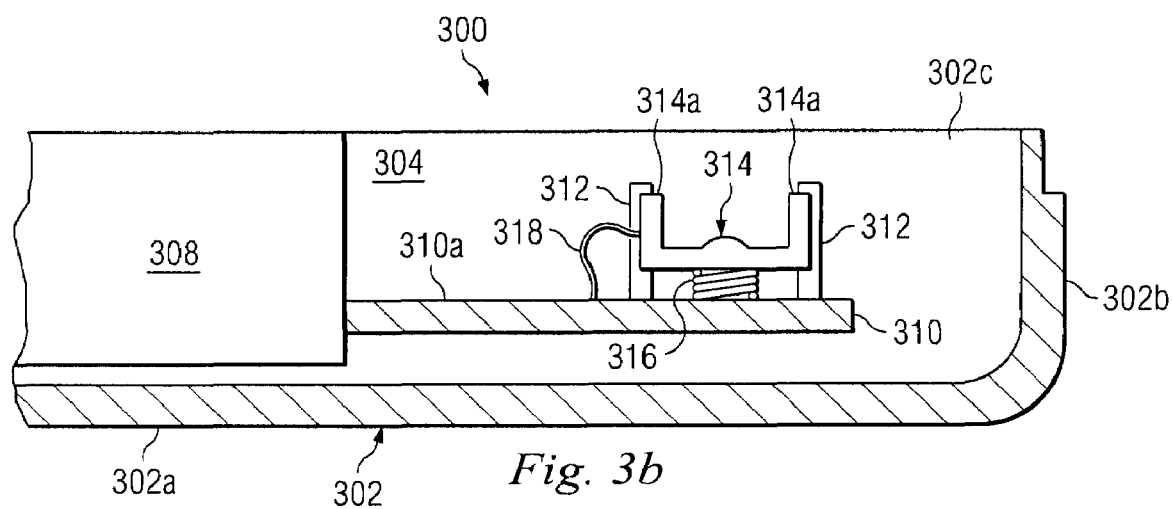

Referring now to FIGS. 3a and 3b, an IHS housing member 300 is illustrated. The IHS housing member 300 includes a base 302 having a bottom wall 302a, a front wall 302b extending substantially perpendicularly from the bottom wall 302a, and a pair of opposing side walls 302c and 302d extending substantially perpendicularly from the bottom wall 302a and the front wall 302b and in a substantially parallel orientation to each other. An IHS housing 304 is defined by the base 302 and located between the bottom wall 302a, the front wall 302b, and the side walls 302c and 302d. A pair of coupling channels 306a and 306b are defined by the bottom wall 302a and the front wall 302b and located in a spaced apart orientation from each other and adjacent the front wall 302b. A display 308 is coupled to the bottom wall 302a and located in the IHS 304. In an embodiment, the display 308 is a Liquid Crystal Display (LCD). A support member 310 including a support surface 310a extends from the display 308 into the IHS housing 304 and is located between the display 308 and the front wall 302b. In an embodiment, the support member 310 is a circuit board. In an embodiment, the support member is an inverter board. A pair of guide members 312 extend substantially perpendicularly from the support surface 310a in a substantially parallel and spaced apart orientation from each other. A light sensor 314 including a wall engagement surface 314a is moveably coupled to the guide members 312. In an embodiment, the light sensor 314 is an ambient light sensor. An extendable member 316 is coupled to the support surface 310a and the light sensor 314. In an embodiment, the extendable member 316 is a resilient member such as, for example, a spring (as illustrated), and/or any member capable of extending from the support surface 310a in order to adjust the distance between the support surface 310a and a sensor coupled to the extendable member 216. A cable 318 is coupled to the support member 310 and to the light sensor 314 and electrically couples the light sensor 314 to the support member 310 such that it is operable to allow power and information to be transferred between the support member 310 and the light sensor 314. In an embodiment, the cable 318 may be omitted and the extendable member 316 may electrically couple the light sensor 314 to the support member 310 such that it is operable to allow power and information to be transferred between the support member 310 and the light sensor 314. In an embodiment, the light sensor 314 is electrically coupled to the display 308 and a processor such as, for example, the processor 102, described above with reference to FIG. 1, with the cable 318 or the extendable member 316 such that the light sensor 314 may adjust the brightness of the display 308.

Figure 4A:
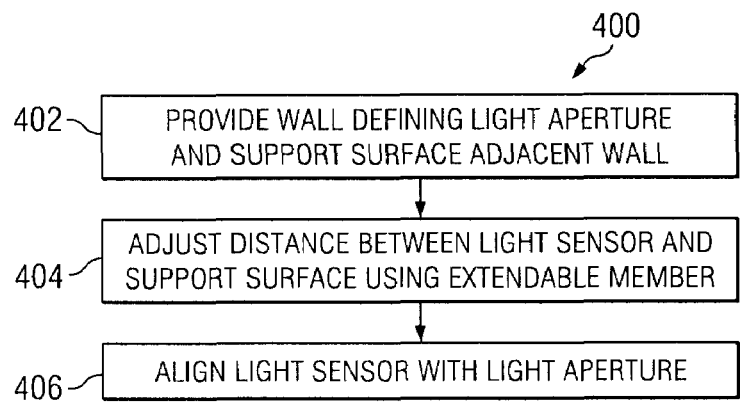
FIG. 4a is a flow chart illustrating a method for aligning a light sensor with a light aperture.
Figure 4B:
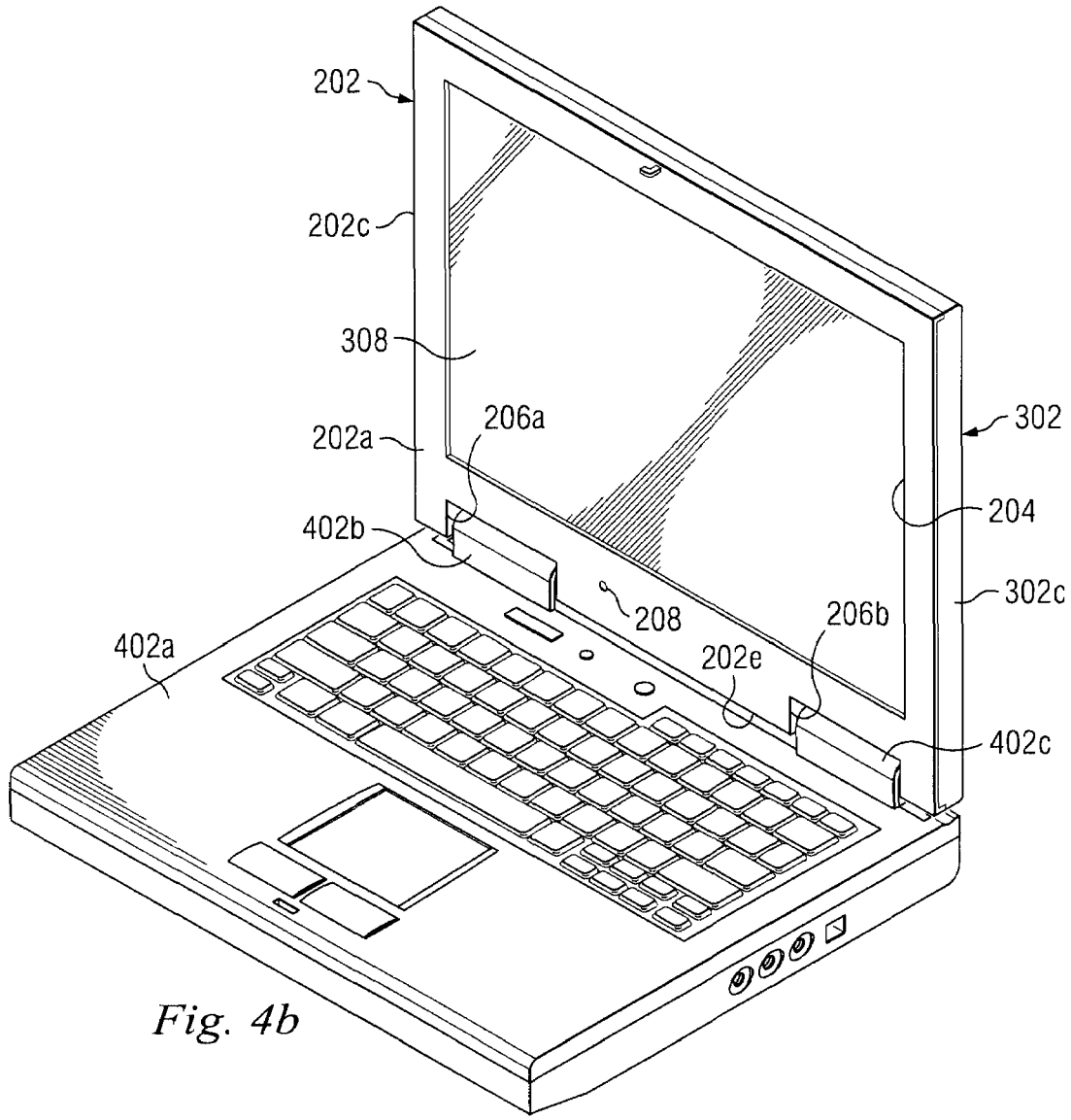
FIG. 4b is a perspective view illustrating an embodiment of the display bezel of FIGS. 2a and 2b and the IHS housing member of FIGS. 3a and 3b coupled to an IHS chassis.
Figure 4C:
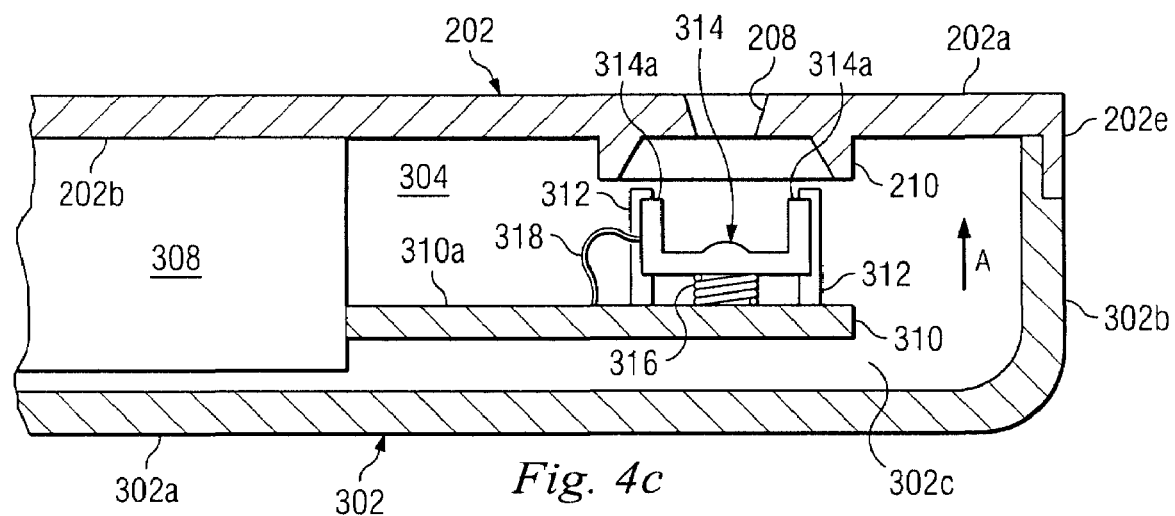
FIG. 4c is a cross sectional view illustrating an embodiment of the display bezel of FIGS. 2a and 2b coupled to the IHS housing member of FIGS. 3a and 3b.

Referring now to FIGS. 2a, 3a, 4a, 4b, 4c and 4d, a method 400 for aligning a light sensor with a light aperture is illustrated. The method 400 begins at step 402 where a wall defining a light aperture and a support surface adjacent the wall are provided. The display bezel 200 and the IHS housing member 300 are coupled together using methods known in the art and engaging the side edges 202c and 202d and the bottom edge 202e of the display bezel 200 with the side walls 302d and 302c and the front wall 302b, respectively, of the IHS housing 300. The display bezel 200 and the IHS housing member 300 combination are then coupled to an IHS chassis 402a by a pair of pivotal coupling members 402b and 402c, as illustrated in FIG. 4b. In an embodiment, the IHS chassis 402a may be, for example, the IHS chassis 116, described above with reference to FIG. 1, and may house some or all of the components of the IHS 100, described above with reference to FIG. 1. With the display bezel 200 and the IHS housing member 300 coupled together, the display 308 is partially located in the display aperture 204 defined by the display bezel 200 and the support surface 310a on the support member 310 is located adjacent to and spaced apart from the wall 202 with the light sensor 314 located adjacent to the light aperture 208 defined by the display bezel 200, illustrated in FIG. 4c.

Figure 4D:
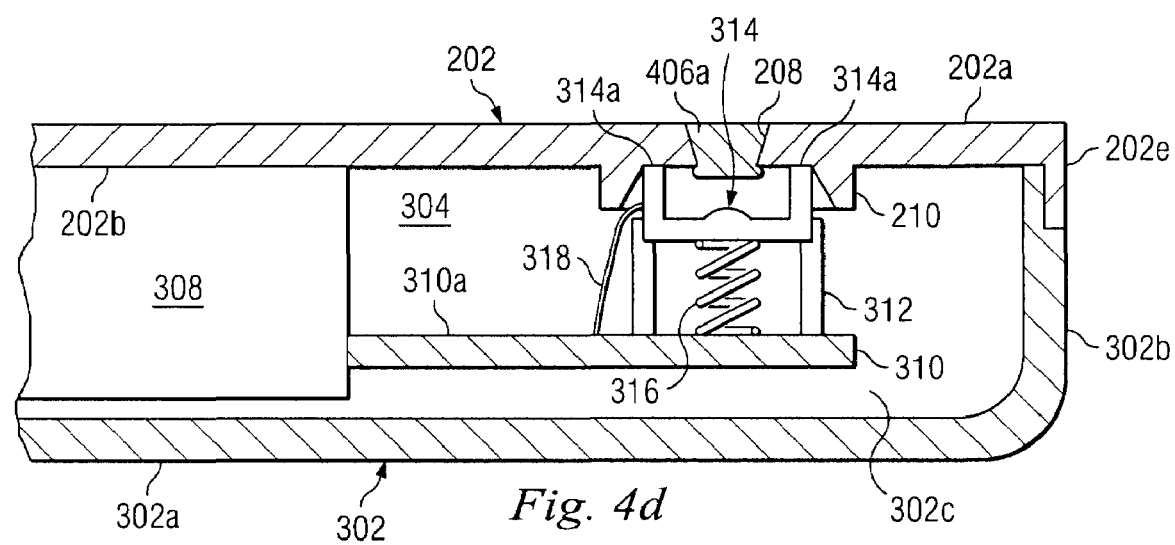
FIG. 4d is a cross sectional view illustrating an embodiment of the display bezel of FIGS. 2a and 2b coupled to the IHS housing member of FIGS. 3a and 3b with the light sensor aligned with the light aperture.

The method 400 then proceeds to step 404 where the distance between the light sensor and the support surface is adjusted using the extendable member. In an embodiment, the extendable member 316 is a resilient member such as, for example, a spring, and will move the light sensor 314 in a direction A along the guide members 312 to adjust the distance between the light sensor 314 and the support surface 310a on the support member 310. The method 400 then proceeds to step 406 where the light sensor is aligned with the light aperture. As the extendable member 316 moves the light sensor 314 in the direction A, the wall engagement surface 314 on the light sensor 314 engages the light sensor alignment member 210 in order to align the light sensor 314 with the light aperture 208, as illustrated in FIG. 4d. In an embodiment, the light sensor alignment member 210 may be removed and the extendable member 316 may be designed such that the extendable member 316 aligns the light sensor 314 with the light aperture 208 by itself. In an embodiment, the light sensor 314 needs an approximately 30 degree cone of light in order to function and step 404 of the method 400 results in the light sensor 314 being positioned immediately adjacent the light aperture 208 such that the light sensor 314 receives the 30 degree cone of light through the light aperture 208. In an embodiment, a lens 406a may be positioned in the light aperture 208 in order to focus light on the light sensor 314. In an embodiment, the distance between the light sensor 314 and the lens 406a is controlled by the wall engagement surfaces 314a to prevent damage to the lens 406a.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A light sensor apparatus, comprising:
a support surface;
a wall located adjacent to and spaced apart from the support surface;
a light aperture defined by a portion of the wall; and
a light sensor coupled to the support surface by an extendable member, whereby the extendable member is operable to adjust the distance between the support surface and the light sensor such that the light sensor is located adjacent the light aperture.

2. The apparatus of claim 1, wherein the support surface is located on a circuit board and the light sensor is electrically coupled to the circuit board.

3. The apparatus of claim 1, wherein the extendable member is a resilient member.

4. The apparatus of claim 1, wherein the extendable member electrically couples the light sensor to the support surface.

5. The apparatus of claim 1, further comprising:
a guide member extending from the support surface, whereby the light sensor is moveably coupled to the guide member.

6. The apparatus of claim 1, further comprising:
a light sensor alignment member located on the wall and adjacent the light aperture.

7. The apparatus of claim 1, further comprising:
a cable extending between the light sensor and the support surface and electrically coupling the light sensor to the support surface.

8. The apparatus of claim 1, further comprising:
a lens located in the light aperture.

9. An information handling system, comprising:
an information handling system chassis comprising a cover wall and defining an information handling system housing;
a light aperture defined by a portion of the cover wall;
a processor located in the information handling system housing;
a board located in the information handling system housing adjacent to and spaced apart from the cover wall; and
a light sensor coupled to the board by an extendable member, whereby the extendable member is extended such that the light sensor is located immediately adjacent the light aperture.

10. The system of claim 9, wherein the board comprises an inverter board, whereby the light sensor is electrically coupled to the inverter board and the processor.

11. The system of claim 9, wherein the extendable member is a resilient member.

12. The system of claim 9, wherein the extendable member electrically couples the light sensor to the board.

13. The system of claim 9, further comprising:
a guide member extending from the board, whereby the light sensor is moveably coupled to the guide member.

14. The system of claim 9, further comprising:
a light sensor alignment member located on the cover wall and adjacent the light aperture.

15. The system of claim 9, further comprising:
a cable extending between the light sensor and the board and electrically coupling the light sensor to the board.

16. The system of claim 9, further comprising:
a lens located in the light aperture.

17. The system of claim 9, further comprising:
a display located in the information handling system housing and electrically coupled to the processor, whereby the board extends from the display.

18. A method for aligning a light sensor with a light aperture, comprising:
providing a wall defining a light aperture and a support surface located adjacent to and spaced apart from the wall;
adjusting the distance between a light sensor and the support surface using an extendable member that couples the light sensor to the support surface; and
aligning the light sensor with the light aperture by positioning the light sensor adjacent the light aperture.

19. The method of claim 18, further comprising:
guiding the light sensor towards the light aperture using a guide member located between the support surface and the cover wall.

20. The method of claim 18, wherein the aligning comprises engaging the light sensor with a light sensor alignment member that is located on the wall and adjacent the light aperture.

* * * * *